June 16, 1931.  H. C. LORD  1,810,718
CAR

Original Filed March 14, 1927

INVENTOR.
Hugh. C. Lord

Patented June 16, 1931

1,810,718

UNITED STATES PATENT OFFICE

HUGH C. LORD, OF ERIE, PENNSYLVANIA

CAR

Application filed March 14, 1927, Serial No. 175,190. Renewed March 2, 1929.

Cars, such as railway cars and street cars, are usually provided with trucks on which the body is swingingly mounted, thus permitting the trucks to follow the track more readily. The jar of the trucks which is communicated to the body from the track as well as the noises which are telephoned through the metallic connections between the truck and body are objectionable. The present invention contemplates dampening the jar and noise vibration in the connection between the truck and the body, thus avoiding the difficulties, or objections heretofore encountered. Features and details of the invention will appear from the specification and claims.

A preferred embodiment of the invention is illustrated in the accompanying drawings as follows:—

Figure 1:
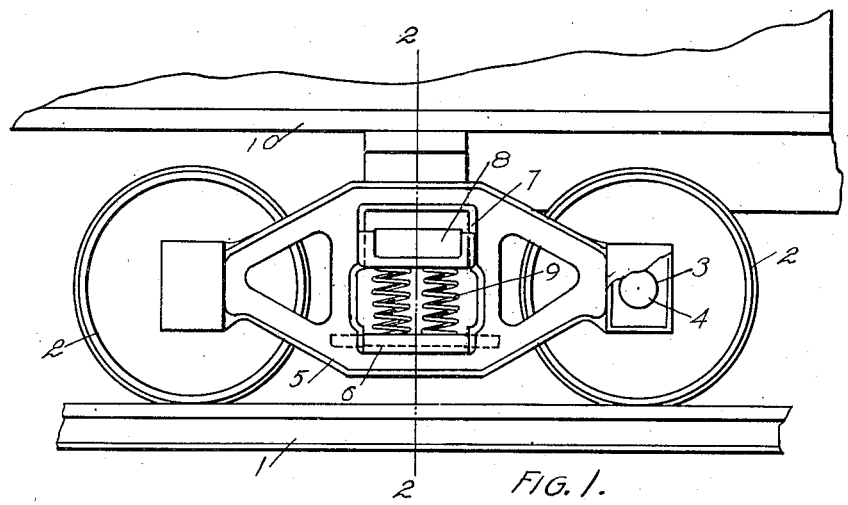

Fig. 1 shows a side elevation of a truck and a portion of a car body.

Figure 2:
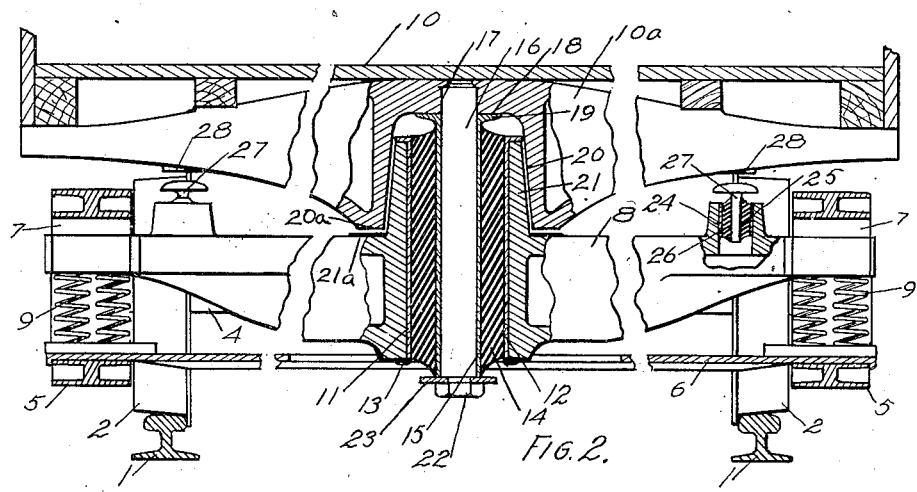

Fig. 2 a section on the line 2—2 in Fig. 1.

Figure 3:
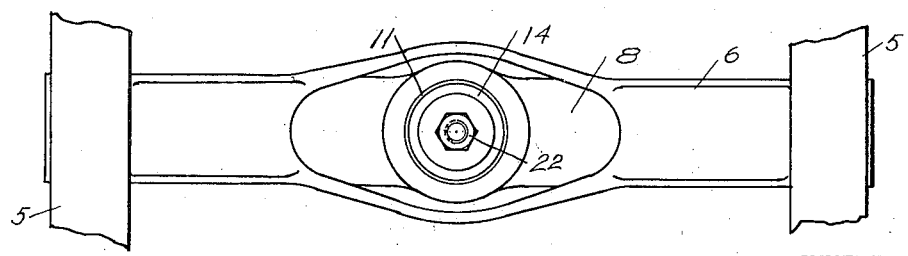

Fig. 3 a bottom view showing the cross members on the truck.

1 marks the track, 2 the wheels of the truck mounted on the track, 3 bearings for the axles, 4 axles connected with the wheels, 5 the side frames of the truck, 6 the cross member of the truck, 7 the bolster guides in the side frames, 8 the bolster, 9 springs supporting the bolster, and 10 the car body. These parts in a general way are, or may be, similar to those now in common use.

The bolster is provided with a socket 11 in which is mounted a shell 12. The bottom end of the shell abuts a shoulder 13 at the bottom of the socket. A rubber member 14 is secured to the inner surface of the shell by surface bonding, preferably during vulcanization and the rubber is also secured by bonding to an inner sleeve 15. A king bolt 16 is arranged within the sleeve 15 and extends into a socket 17 in the cross member 10a of the car body. The cross member is provided with a socket, the bottom of the socket forming a face 18 resting on a flange 19 arranged on the top of the sleeve 15. The side walls 20 of the socket surround a projection 21 extending upwardly from the bolster and surfaces 20a and 21a are maintained normally out of contact as well as the wall 20 which has a clearance from the wall 21.

In the general operation of this device the load of the car body is carried entirely by the rubber member. This rubber member is thus put under tension. Where the rubber member is vulcanized in the bonding operation it is under initial tension due to the contraction of the rubber and the weight of the car acting upon this hammock-wise increases this tension.

Rubber put under compression loses its dampening effect in proportion to the compression so that rubber inserts, carrying a substantial weight have very little dampening effect, particularly as to such vibrations that communicate noise and jar. But rubber under tension has a great capacity for dampening out all jar and vibration. With the present construction the entire car body is maintained by rubber under tension and this is preferably arranged as shown concentric with the swinging center of the truck, thus very much simplifying the construction. The king pin 16 may turn in the sleeve 15 but ordinarily the frictional engagement of the face 18 on the flange 19 will be greater than the resistance to the initial turning through the distortion of the rubber 14. By providing the pin with a nut 22, clamping the end of the sleeve through a washer 23 the sleeve may be clamped with the pin so that under all conditions the entire turning movement is taken care of by the rubber. This, however, in general is not necessary as the frictional engagement will accomplish the ordinary turns through the distortion of the rubber, thus eliminating the objectionable grinding noises that might accompany the turning of metal on metal.

Ordinarily the king pin acting through the rubber maintains the car body in its upright position but if undue strain is placed upon it this is preferably secured by sway supports and in order to prevent metallic jar, or noise vibration being communicated from the truck to the car on such swaying I prefer to provide sway supports through similar rubber dampeners at the sway supports. For this purpose the bolsters are provided with sockets 24 in which are arranged shells 25 having rubber inserts 26 and a central pin 27 to which the rubber is preferably secured by bonding,—in other words a miniature rubber dampener similar to the one heretofore described at the center of the car except that the central member may be a solid pin as distinguished from a sleeve. Arcuate rub plates 28 are provided on the cross member 10a of the car body normally out of contact with the pin 27 but in position to engage the pin with any undue swaying of the body.

What I claim as new is:—

1. In a car, the combination of a truck; a body pivotally mounted on the truck; and rubber dampener means between the truck and body insulating the body from metallic contact with the truck.

2. In a car, the combination of a truck; a body pivotally mounted on the truck; and rubber dampener means between the truck and body sustaining the weight of the body and insulating the body from metallic contact with the truck.

3. In a car, the combination of a truck; a body pivotally mounted on the truck; and rubber dampener means concentric with the axis of the truck between the truck and the body and insulating the body from metallic contact with the truck.

4. In a car, the combination of a truck; a body pivotally mounted on the truck; and rubber dampener means concentric with the axis of the truck between the truck and the body sustaining the weight of the body and insulating the body from metallic contact with the truck.

5. In a car, the combination of a truck; a body mounted on the truck; and rubber dampener means under tension between the body and the truck.

6. In a car, the combination of a truck; a body mounted on the truck; and rubber dampener means under tension between the truck and the body and sustaining the weight of the body.

7. In a car, the combination of a truck; a body pivotally mounted on the truck; and rubber dampener means under tension sustaining the weight of the body.

8. In a car, the combination of a truck; a body pivotally mounted on the truck; and rubber dampener means under tension sustaining the weight of the body and concentric with the axis of the truck.

9. In a car, the combination of a truck; a body pivotally mounted on the truck; and a rubber dampener comprising an annular member, a central member, and interposed rubber between the members bonded to the members, said rubber maintaining the weight of the body.

10. In a car, the combination of a truck; a body pivotally mounted on the truck; and a rubber dampener concentric with the axis of the truck comprising an outer annular member, a central member, and interposed rubber bonded to said members, said interposed rubber sustaining the vertical and horizontal thrusts between the truck and body.

11. In a car, the combination of a truck; a body pivotally mounted on the truck; and a rubber dampener concentric with the axis of the truck comprising an outer annular member, a central member, and interposed rubber bonded to said members, said interposed rubber sustaining the vertical and horizontal thrusts between the truck and body and a pivotal movement of the truck through the distortion of the rubber.

12. In a car, the combination of a truck; a body pivotally mounted on the truck; and a rubber dampener concentric with the axis of the truck comprising an outer annular member, a central member, interposed rubber bonded to said members, said interposed rubber sustaining the vertical and horizontal thrusts between the truck and body, and a supplemental pivotal mounting normally out of contact.

13. In a car, the combination of a truck; a body pivotally mounted on the truck; a rubber dampener concentric with the axis of the truck and sustaining the weight of the body; and side sway supports comprising rubber dampeners, said rubber dampeners insulating the body from metallic contact with the truck.

14. In a car, the combination of a car truck; a body pivotally mounted on the truck; a rubber dampener comprising an annular member, a central member with interposed rubber between said members and secured to said members, said rubber sustaining the weight and thrusts between the body and the truck; and side sway supports comprising rubber dampeners, said rubber dampeners insulating the body from metallic contact with the truck.

15. In a car, the combination of a car truck; a body pivotally mounted on the truck; a rubber dampener comprising an annular member, a central member with interposed rubber between said members and secured to said members, said rubber sustaining the weight and thrusts between the body and truck and being under tension; and side sway supports comprising rubber dampeners.

16. In a car, the combination of a car truck; a body pivotally mounted on the truck; a rubber dampener comprising an annular member and a central member with interposed rubber between said members and secured to said members, said rubber sustaining the weight and thrusts between the body and truck; and side sway supports comprising rubber dampeners, all of said dampeners operating with the rubber under tension.

17. In a car, a truck having a supporting member with a socket and an upwardly extending flange; a car body having a supporting member with a socket, the walls of which surround the flange; and a rubber dampener arranged in the socket in the truck member comprising rubber secured to the walls of the socket, and a central member to which the rubber is secured, said central member engaging the supporting member of the body and maintaining the load of the body with the supporting members out of contact.

18. In a car, the combination of a truck; a body pivotally mounted on the truck; and a rubber dampener between the truck and body, said dampener cushioning the body at the pivot axially and radially.

In testimony whereof I have hereunto set my hand.

HUGH C. LORD.